(12) United States Patent
Baghel et al.

(10) Patent No.: US 10,420,163 B2
(45) Date of Patent: Sep. 17, 2019

(54) SYSTEM AND A METHOD OF CONFIGURING RADIO ACCESS NETWORK PARAMETERS FOR A USER EQUIPMENT CONNECTED TO A WIRELESS NETWORK SYSTEM

(71) Applicant: Samsung Electronics Co., Ltd., Suwon-si, Gyeonggi-do (KR)

(72) Inventors: Sudhir Kumar Baghel, Bangalore (IN); Venkateswara Rao Manepalli, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/246,023

(22) Filed: Aug. 24, 2016

(65) Prior Publication Data

US 2017/0019948 A1    Jan. 19, 2017

Related U.S. Application Data

(63) Continuation of application No. 14/348,990, filed as application No. PCT/KR2012/008045 on Oct. 4, 2012, now abandoned.

(30) Foreign Application Priority Data

Oct. 4, 2011    (IN) ............................ 3442/CHE/2011
Sep. 28, 2012    (IN) ............................ 3442/CHE/2011

(51) Int. Cl.
*H04W 76/28*    (2018.01)
*H04W 52/02*    (2009.01)
(Continued)

(52) U.S. Cl.
CPC ............. *H04W 76/28* (2018.02); *H04W 8/02* (2013.01); *H04W 52/0203* (2013.01);
(Continued)

(58) Field of Classification Search
None
See application file for complete search history.

(56) References Cited

U.S. PATENT DOCUMENTS

2007/0286112 A1    12/2007    Prakash et al.
2007/0291673 A1*   12/2007    Demirhan ......... H04W 52/0216
                                                              370/311
(Continued)

FOREIGN PATENT DOCUMENTS

CN    101595752 A    12/2009
CN    101652939 A    2/2010
(Continued)

OTHER PUBLICATIONS

Seung-Hwan Lee et al., Power Saving Mechanisms for LTE Base Stations Using Traffic Characteristic, The journal of the Korea institute of intelligent transport systems, Feb. 2010, vol. 9, No. 1, pp. 49-54.

(Continued)

*Primary Examiner* — Chi H Pham
*Assistant Examiner* — Vladislav Y Agureyev
(74) *Attorney, Agent, or Firm* — Jefferson IP Law, LLP

(57) ABSTRACT

The present invention relates to a method of configuring a set of Radio Access Network (RAN) parameters including Discontinuous Reception (DRX) configurations for user equipment in a wireless networking system. The method includes determining traffic characteristics associated with user equipment based on the number and types of applications running in it. The method further includes steps of modifying and updating the DRX configurations and the RAN parameters for different situations of wireless transmission and reception. The updated DRX configurations and the RAN parameters for communication with the user equipment results in an efficient power consumption management.

10 Claims, 12 Drawing Sheets

(51) Int. Cl.
*H04W 8/02* (2009.01)
*H04W 52/22* (2009.01)
*H04W 52/28* (2009.01)
*H04W 24/02* (2009.01)

(52) U.S. Cl.
CPC ....... *H04W 52/0216* (2013.01); *H04W 52/22* (2013.01); *H04W 52/285* (2013.01); *H04W 24/02* (2013.01); *Y02D 70/1262* (2018.01); *Y02D 70/142* (2018.01); *Y02D 70/146* (2018.01); *Y02D 70/21* (2018.01); *Y02D 70/24* (2018.01)

(56) References Cited

U.S. PATENT DOCUMENTS

| | | | |
|---|---|---|---|
| 2008/0232310 A1 | 9/2008 | Xu | |
| 2008/0248840 A1 | 10/2008 | Kim et al. | |
| 2009/0233653 A1* | 9/2009 | Kim | H04W 52/04 455/574 |
| 2010/0002614 A1 | 1/2010 | Subrahmanya | |
| 2010/0130237 A1 | 5/2010 | Kitazoe et al. | |
| 2010/0302980 A1* | 12/2010 | Ji | H04W 52/0216 370/311 |
| 2010/0309798 A1 | 12/2010 | Fodor et al. | |
| 2011/0026484 A1 | 2/2011 | Fox et al. | |
| 2011/0199910 A1 | 8/2011 | Oh et al. | |
| 2012/0120843 A1* | 5/2012 | Anderson | H04W 76/048 370/253 |
| 2012/0207069 A1* | 8/2012 | Xu | H04W 52/0222 370/311 |
| 2012/0243417 A1* | 9/2012 | Henttonen | H04W 76/046 370/241 |
| 2012/0263051 A1 | 10/2012 | Willars et al. | |
| 2012/0320791 A1* | 12/2012 | Guo | H04W 52/0212 370/254 |
| 2013/0083713 A1* | 4/2013 | Johansson | H04W 52/0225 370/311 |
| 2013/0242832 A1* | 9/2013 | Koc | H04W 28/0268 370/311 |
| 2013/0301500 A1* | 11/2013 | Koc | H04W 4/90 370/311 |
| 2014/0071872 A1* | 3/2014 | Guo | H04W 52/0261 370/311 |
| 2014/0092799 A1* | 4/2014 | Jain | H04W 4/70 370/311 |

FOREIGN PATENT DOCUMENTS

| | | |
|---|---|---|
| CN | 01796870 A | 8/2010 |
| EP | 2 140 578 A1 | 1/2010 |
| EP | 2 186 212 A1 | 5/2010 |
| EP | 2 355 602 A1 | 8/2011 |
| KR | 10-2008-0087749 A | 10/2008 |
| KR | 10-2011-0039329 A | 4/2011 |
| RU | 2 420 003 C2 | 7/2010 |

OTHER PUBLICATIONS

Korean Office Action dated Aug. 7, 2018, issued in a counterpart Korean application No. 10-2014-7011917.

* cited by examiner

SYSTEM AND A METHOD OF CONFIGURING RADIO ACCESS NETWORK PARAMETERS FOR A USER EQUIPMENT CONNECTED TO A WIRELESS NETWORK SYSTEM

This application is a continuation application of prior U.S. National Stage application Ser. No. 14/348,990, filed on Apr. 1, 2014 and claimed the benefit under 35 U.S.C § 119(a) of a Indian patent application filed on Oct. 4, 2011 in the Indian Intellectual Property Office and assigned Serial number 3442/CHE/2011, the entire disclosure of which is hereby incorporated by reference.

TECHNICAL FIELD

The present invention relates to mobile communication technology. More specifically, relates to management of radio network access parameters of user equipment connected to a wireless network such as a Long Term Evolution (LTE) type of network, thereby contributing to reduced power consumption.

BACKGROUND ART

In recent days, user equipment such as a smart phone is used for multiple purposes to assist a user. This multipurpose usage has led to invention of number of applications that are available and compatible to run in the smart phone. Each of the applications that are running in the smart phone either simultaneously or discretely contribute heavily to the consumption of battery power of the smart phone.

Generally, in a Long Term Evolution (LTE), a broadband based network, the smart phone present in it is configured to enter either an idle mode or a connected mode as and when required. And a set of radio access network parameters are configured in the smart phone during either of the modes and during transition between the two.

The smart phone enters the connected mode by receiving a Radio Resource Control (RRC) connection setup message to a network system and enters the idle mode by receiving a RRC connection release message to the network system. When the smart phone is in the connected mode, an active data transfer link (uplink or downlink) is established and the applications remain active in the smart phone. When the smart phone is in the idle mode, the applications can still be running pertaining to the nature or type of the applications running in the smart phone, wherein the applications contribute directly to data transfer. Further, it is likely that the smart phone may enter a Discontinuous Reception (DRX) mode when it is in connected mode.

The power consumption by the user equipment may be determined partly by the DRX configuration, other Radio Access Network (RAN) parameters, and number of transitions between the idle and the connected mode by the user equipment. Each of the applications running in the smart phone contributes to the configuration of the DRX configuration, the transitions, and data traffic characteristics observed between the smart phone and the network system.

DISCLOSURE OF INVENTION

Technical Problem

The network system may be enabled to configure the DRX configuration for the smart phone independently to better configure the data traffic characteristics. However, the network system may not be fully aware of the smart phone and its related information while configuring the DRX configuration. Hence, a better configuration of the DRX configuration results in reduced power consumption of the smart phone making it to last longer in a particular charge-discharge cycle.

Solution to Problem

A method of configuring parameters of a Radio Access Network (RAN) in a wireless network system, comprising: receiving a plurality of Discontinuous Reception (DRX) configurations from a network entity of the wireless network system, wherein the plurality of DRX configurations is one of the parameters of the RAN; determining traffic characteristics of applications running in the user equipment; selecting one of the plurality of DRX configurations based on the traffic characteristics associated with the user equipment; and transmitting information on the selected DRX configuration to the network entity so that the network entity applies the selected DRX configuration for the user equipment.

Advantageous Effects of Invention

In an embodiment, as a part of the process of traffic monitoring or the DPI, involves cost in performing the same, it may not be advantageous to perform traffic monitoring/DPI very frequently.

MODE FOR THE INVENTION

In an embodiment of the present invention, a method of managing parameters of a Radio Access Network (RAN) in a wireless network system is provided. The method includes the steps of receiving a plurality of Discontinuous Reception (DRX) configurations from a network entity of the wireless network system, determining traffic characteristics of applications running in the user equipment, selecting one of the plurality of DRX configurations based on the traffic characteristics associated with the user equipment, and transmitting information on the selected DRX configuration to the network entity so that the network entity applies the selected DRX configuration for the user equipment.

In an embodiment of the present invention, a method of configuring parameters of a Radio Access Network (RAN) in the wireless network system is provided. The method includes the steps of providing a plurality of DRX configurations to the user equipment by a network entity of the wireless network system, receiving a DRX configuration from the plurality of DRX configurations from the user equipment, wherein the received DRX configuration is selected by the user equipment based on traffic characteristics, and applying the received DRX configuration for communication with the user equipment.

Figure 1:
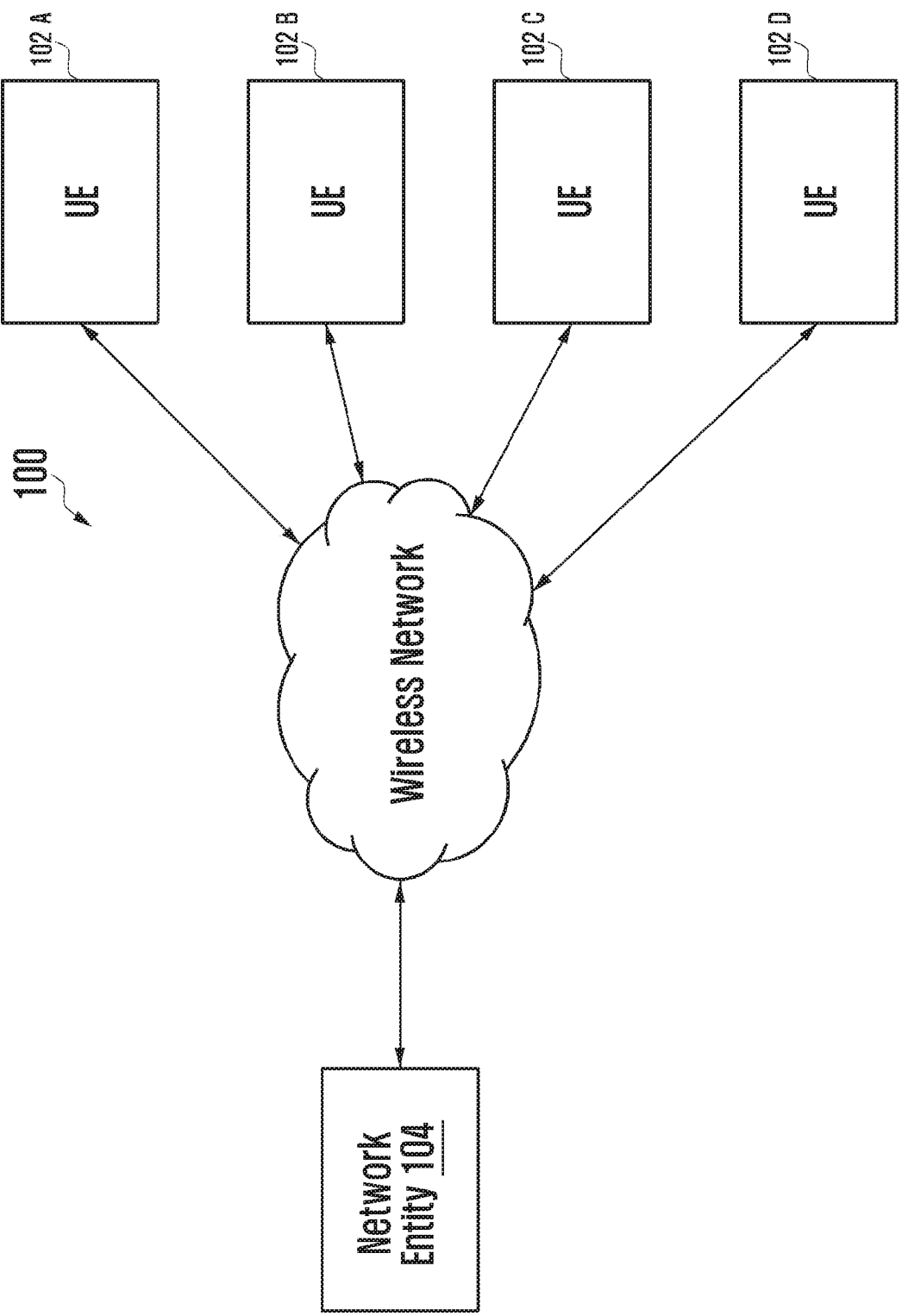
FIG. 1 illustrates a block diagram of a network system, in accordance with an embodiment of the present invention.

FIG. 1 illustrates a block diagram of a network system 100, in accordance with an embodiment of the present invention.

The network system 100 includes User Equipment (UE) 102 connected to more than one network entities 104 through a wireless network 106. The UE 102 communicates with the network entities 104 with a set of parameters called Random Access Network (RAN) parameters that configure the network settings enabling the UE 102 to communicate. For example, if the UE 102 is a smart phone or an advanced mobile communication device, most of the power consumption of the UE 102 is determined by the RAN parameters.

Figure 2:
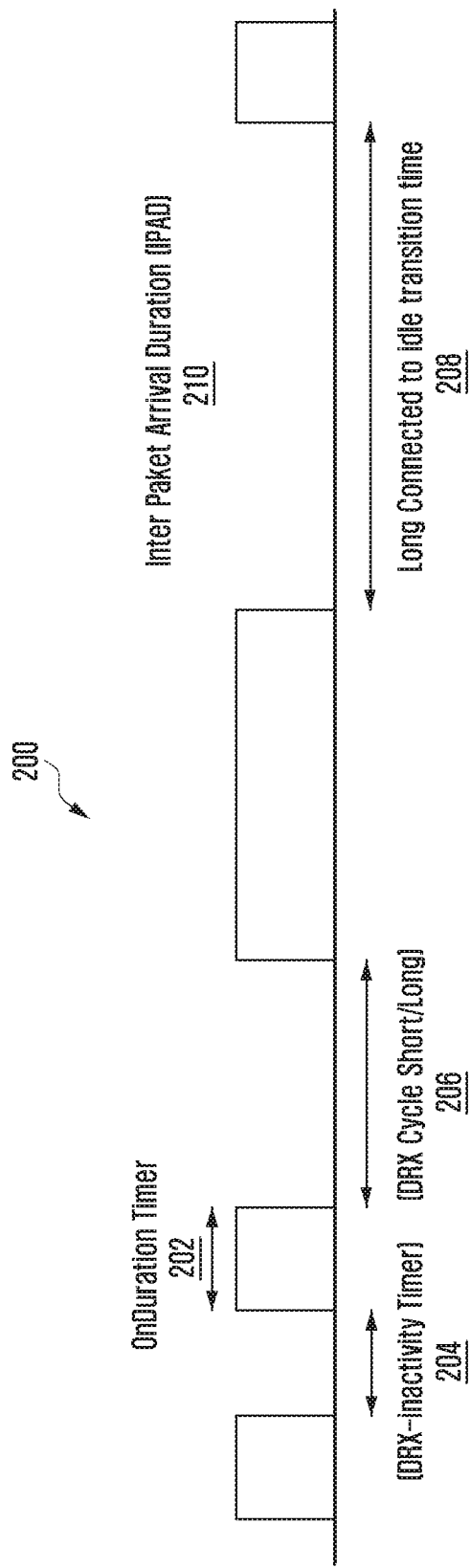
FIG. 2 illustrates schematic view of an exemplary DRX configuration for communication with the user equipment in a wireless networking system.

FIG. 2 illustrates schematic view of an exemplary DRX configuration 200 for communication with the user equipment in a wireless networking system.

In an embodiment of the present invention the DRX pattern determined with the help of the UE 102 may at least include one or more of the parameters such as drx-InactivityTimer, onDurationTimer, longDRX-Cycle, shortDRX-Cycle, and drxShortCycleTimer.

As shown in FIG. 2, delays in a data connection can be mapped to the activity transions in the system 100 in ways such as short Inter Packet Arrival Duration (IPAD) can be mapped to drx-InactivityTimer 204 of the UE 102 for communication with one of the network entities. A medium IPAD can be mapped to DRX cycle periods (long/short) 206 of the UE 102 for communication with one of the network entities. A long IPAD can be mapped to Connected to Idle transition time of the UE 102 for communication with one of the network entities. The minimum possible continuous data activity after data activity starting events can be mapped to OnDurationTimer 202 of the UE 102 for communication with one of the network entities.

In another embodiment, when the UE 102 is providing the assistance to the eNB 104 (one of the network entities), for each of the parameters of the DRX configuration the UE 102 may utilize certain information. For example, in case of presence of keep-alive applications running in the UE 102, heart beat interval or pulse of the applications can be mapped to the DRX cycle duration, one of the parameters of the DRX configuration. For another example, minimum possible packet size and the corresponding radio time that UE 12 and the eNB 104 takes at every pulse interval can be mapped to the OnDurationTimer, one of the parameters of the DRX configuration. A processing time an application needs to process the commands/requests of user and respond with data or further commands/requests can be mapped to drx-Inactivity timer of the UE 102, wherein the drx-Inactivity timer is one of the parameters of the DRX configurations.

Further it may be preferable when there are more than one application being executed in the UE 102, in parallel mode, the DRX parameter selection may be performed by the UE 102 in combination with the eNB 104 be in such a way that it suits operating conditions of all the applications. In such conditions, for example, values corresponding to application with highest quality of service may be used to map EPS (Evolved Packet System) bearers. For another example, values corresponding to application with mean or median quality of service can be used to map EPS bearers. For yet another example, the UE 102 can collect the data of all the applications or the applications with high quality of service/priority running over a timer period and can process to get the IPAD of the data packets and categorize the IPAD in 2 zones short, medium and long, and map them to the DRX configurations. Further the UE 102 may make a CDF (Cumulative Distibutive Function) and PDF (Probability Density Function) with the IPAD, and can map the values accordingly. Examples for such mapping of values are short IPAD to alpha probability, medium IPAD to beta probability, and long IPAD to gamma probability. Further, in such examples, values of alpha, beta, and gamma can be derived by the UE 102 or can be provided by one of the network entities. Further, the eNB 104 may as it is use the values suggested by the UE 104 or does some additional processing. Based on the availability of DPI inputs and quality of service inputs which are now known to the UE 102 as an ARP (Admission and Retention Priority) of the EPS bearer, the eNB 104 can further optimize. In the eNB 104, DPI can provide all the above said information of IPAD statistics. For example, DPI can also provide details of protocols that are running in a particular mobile device, which the eNB 102 may prioritize for those services using such protocols.

In an embodiment, as a part of the process of traffic monitoring or the DPI, involves cost in performing the same, it may not be advantageous to perform traffic monitoring/DPI very frequently. Hence, it may be advantageous to preserve the values of the RAN parameters at the end of fine tuning or the end of the current connection and retrieve them at the initiation of the next connection. The retrieved parameters can be immediately be used in the new connection as they will be already optimized and if required can be fine-tuned again later in the connection. This saving of the parameters can be either done in the eNB 104 or the MME 106 or any of the network entities.

Figure 3A:
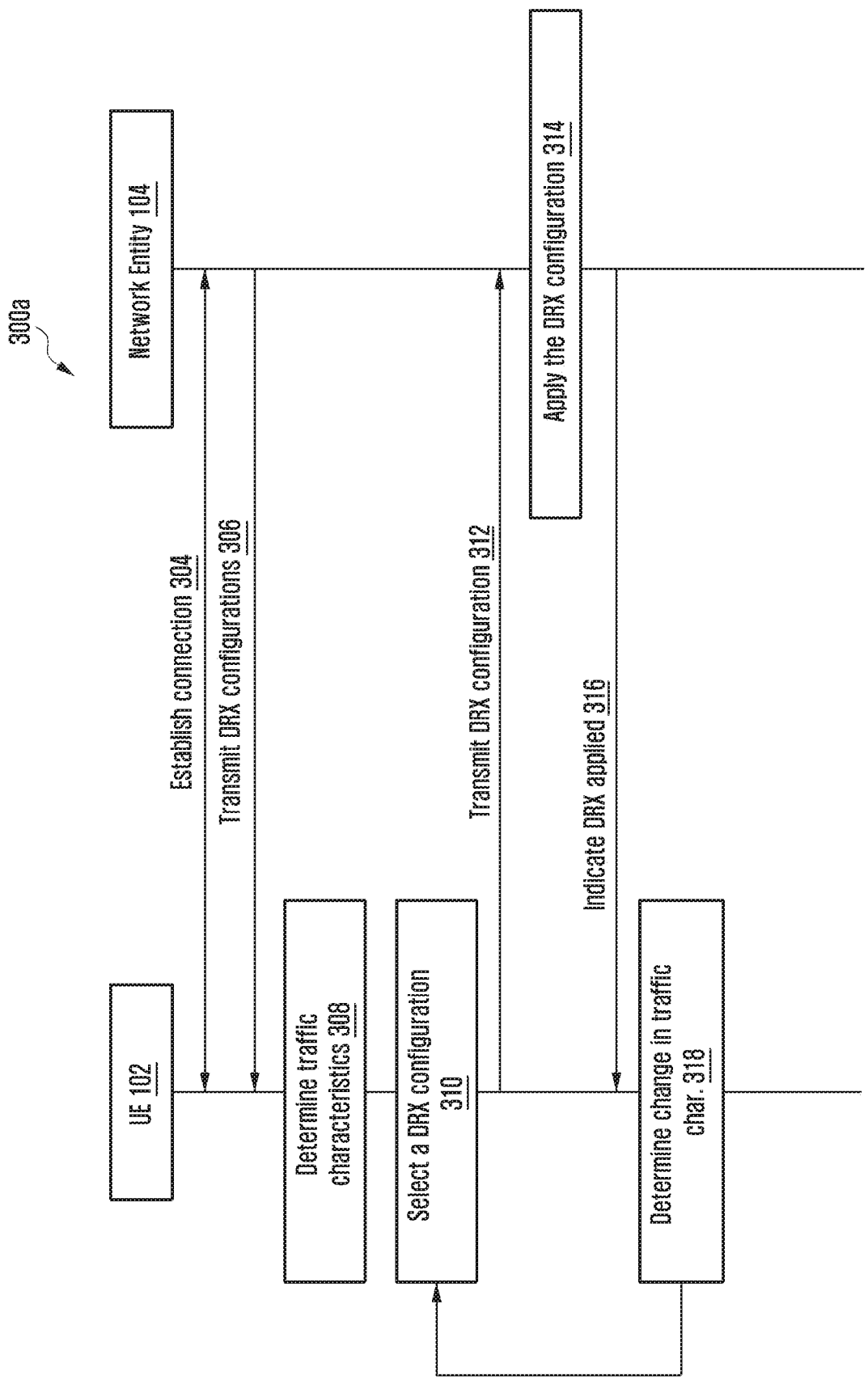
FIG. 3a illustrates a flow diagram on a process of configuring one of the Radio Access Network (RAN) parameters, Discontinuous Reception (DRX) configuration, in accordance with an embodiment of the present invention.

FIG. 3a illustrates a flow diagram on a process 300a of configuring one of the Radio Access Network (RAN) parameters, Discontinuous Reception (DRX) configuration, in accordance with an embodiment of the present invention.

The process 300a denotes the effect of change in traffic characteristics of the UE 102 in determining the RAN parameters including the DRX configuration. The connection is established at 304. The network entity 106 transmits a plurality of DRX configurations to the UE 102 at 306. The UE 102 determines the traffic characteristics based on the number or types of the applications that are currently being executed in the UE 102 at 308. Based on the traffic characteristics, the UE 102 selects one among the plurality of DRX configurations at 310. The UE 102 transmits information on the selected DRX configuration to the network entity 106, denoted as 312. The network entity 104 applies the selected DRX configuration in the UE 102 for communication; the step is denoted as 314. The UE 102 determines if there is a change in traffic characteristics, and the steps of the process 300a from 310 to 316 are repeated.

Figure 3B:
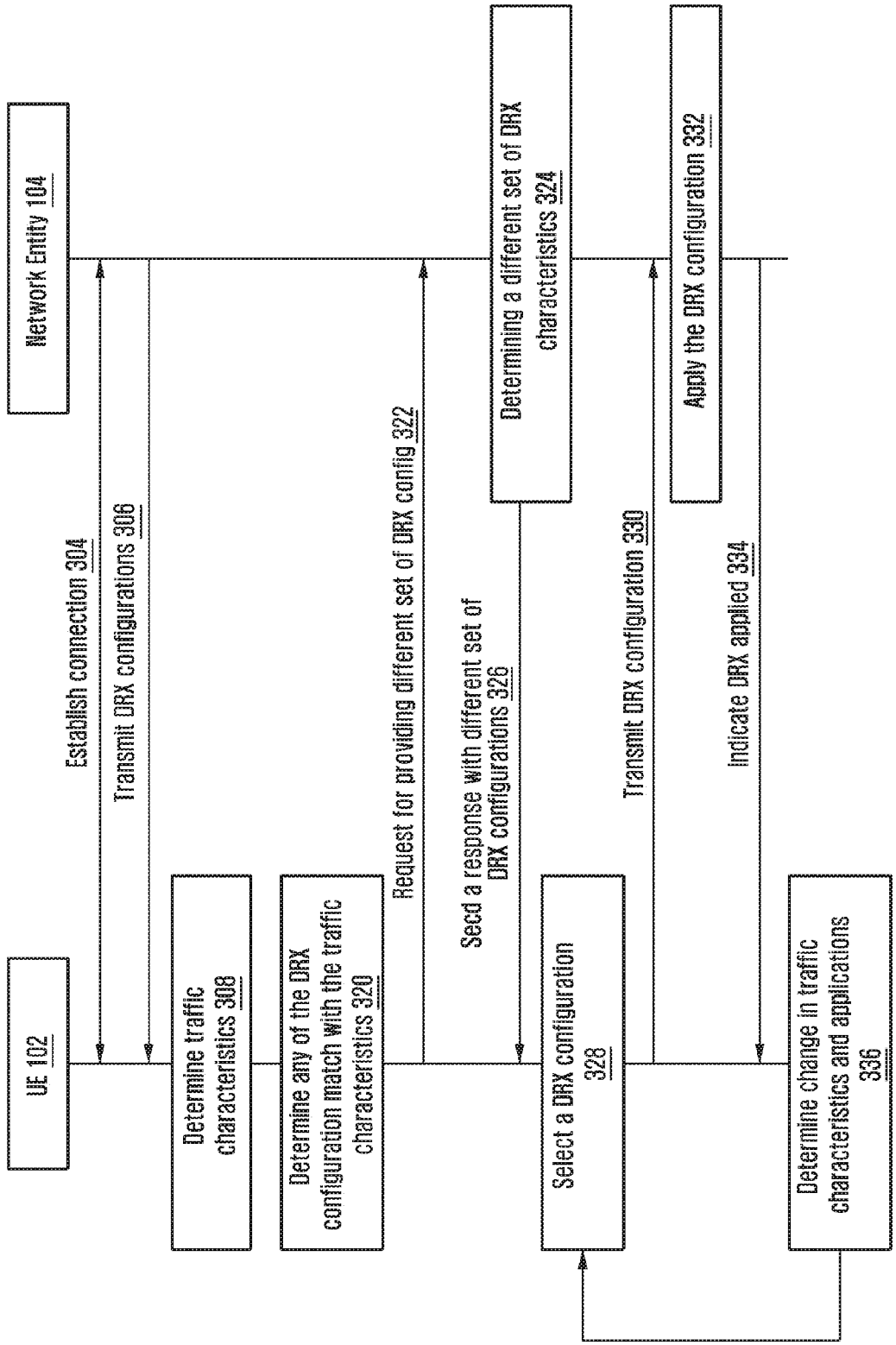
FIG. 3b illustrates a flow diagram on a process of configuring one of the Radio Access Network (RAN) parameters, Discontinuous Reception (DRX) configuration, in accordance with an embodiment of the present invention.

FIG. 3b illustrates a flow diagram on a process 300b of configuring one of the Radio Access Network (RAN) parameters, Discontinuous Reception (DRX) configuration, in accordance with an embodiment of the present invention.

The process 300b begins with establishing connection in the network at 304. The network entity 106 transmits a plurality of DRX configurations to the UE 102 at 306. The UE 102 determines the traffic characteristics based on the number or types of the applications that are currently being executed in the UE 102 at 308. At 320, the UE 102 determines whether there is any of the plurality of DRX configurations transmitted at step 308 matches the traffic characteristics of the UE 102. When there is not matching DRX configuration available in the plurality of DRX configurations, the UE 102 requests to provide a different set of configurations, the step is denoted by 322. The network entity 104 determines a different set of plurality of DRX configurations; the step is denoted by 324. A response is sent to the UE 102 by the network entity 104, at step 326. When the UE 102 selects one among the different set of plurality of DRX configurations at step 328, a transmission is sent consequently with selected DRX configuration, denoted as 330. The selected DRX configuration is applied at step 332 by the network entity 104 on the UE 102. Thereafter, application of DRX configuration is indicated at the UE 102, denoted as 334. Thereafter, it is determined whether there is any change in the traffic configurations of the UE 102, if there is any, steps 328 to 334 is repeated.

Figure 3C:
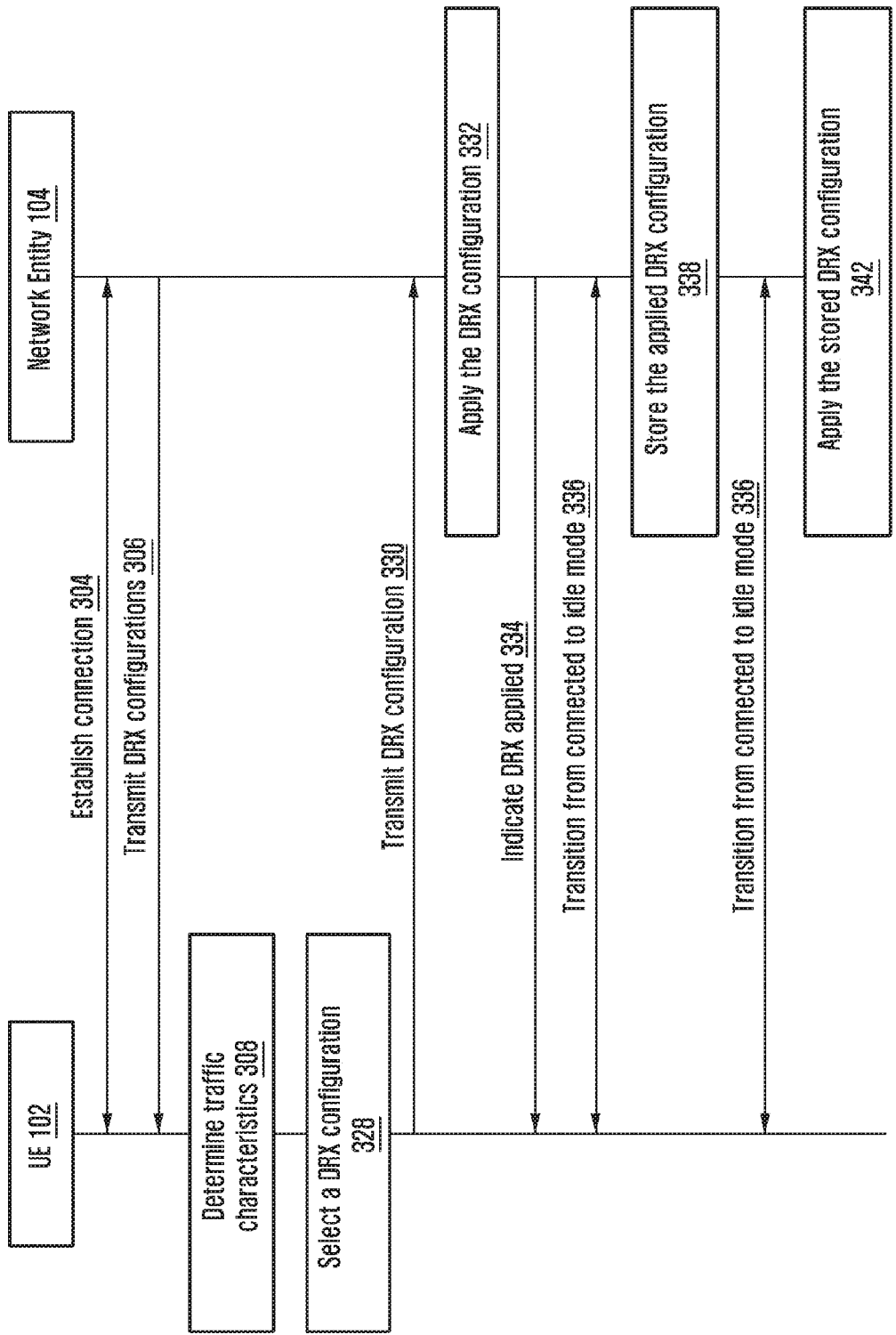
FIG. 3c illustrates a flow diagram on a process of configuring one of the Radio Access Network (RAN) parameters, Discontinuous Reception (DRX) configuration, in accordance with an embodiment of the present invention.

FIG. 3c illustrates a flow diagram on a process 300c of configuring one of the Radio Access Network (RAN) parameters, Discontinuous Reception (DRX) configuration, in accordance with an embodiment of the present invention.

The process 300c illustrates one of the modes of configuring the DRX pattern including other RAN parameters. The set of parameters or RAN parameters include Channel Quality Indicator (CQI), Scheduling Request (SR), Precoding Matrix Indicator (PMI), Rank Indication (RI), and Sounding Reference Signal (SRS), connected to idle transition time. The connection is established at 304. The network entity 106 transmits a plurality of DRX configurations to the UE 102 at 306. The UE 102 determines the traffic characteristics based on the number or types of the applications that are currently being executed in the UE 102 at 308. The UE 102 selects a DRX configuration among the plurality of DRX configurations. When the UE 102 selects one among the different set of plurality of DRX configurations at step 328, a transmission is sent consequently with selected DRX configuration, denoted as 330. The selected DRX configuration is applied at step 332 by the network entity 104 on the UE 102. Thereafter, application of DRX configuration is indicated at the UE 102, denoted as 334. The transition of the UE 102 from the connected mode to the idle mode is denoted by the UE 102, at step 336. Similar to DRX configuration other RAN parameters can also be shared and negotiated between the UE 102 and the network entity 104 for configuration. The applied DRX configuration and/or RAN parameters is stored, in the step 338. Thereafter, transition from the idle mode to the connected mode is denoted by the UE 102. The stored DRX configuration and/or RAN parameters of step 338, is applied at the UE 102 at step 342. In an embodiment, the DRX configuration include DRX Inactivity Timer, on-duration timer, long DRX-Cycle, short DRX-Cycle, and DRX Short Cycle Timer.

Figure 3D:
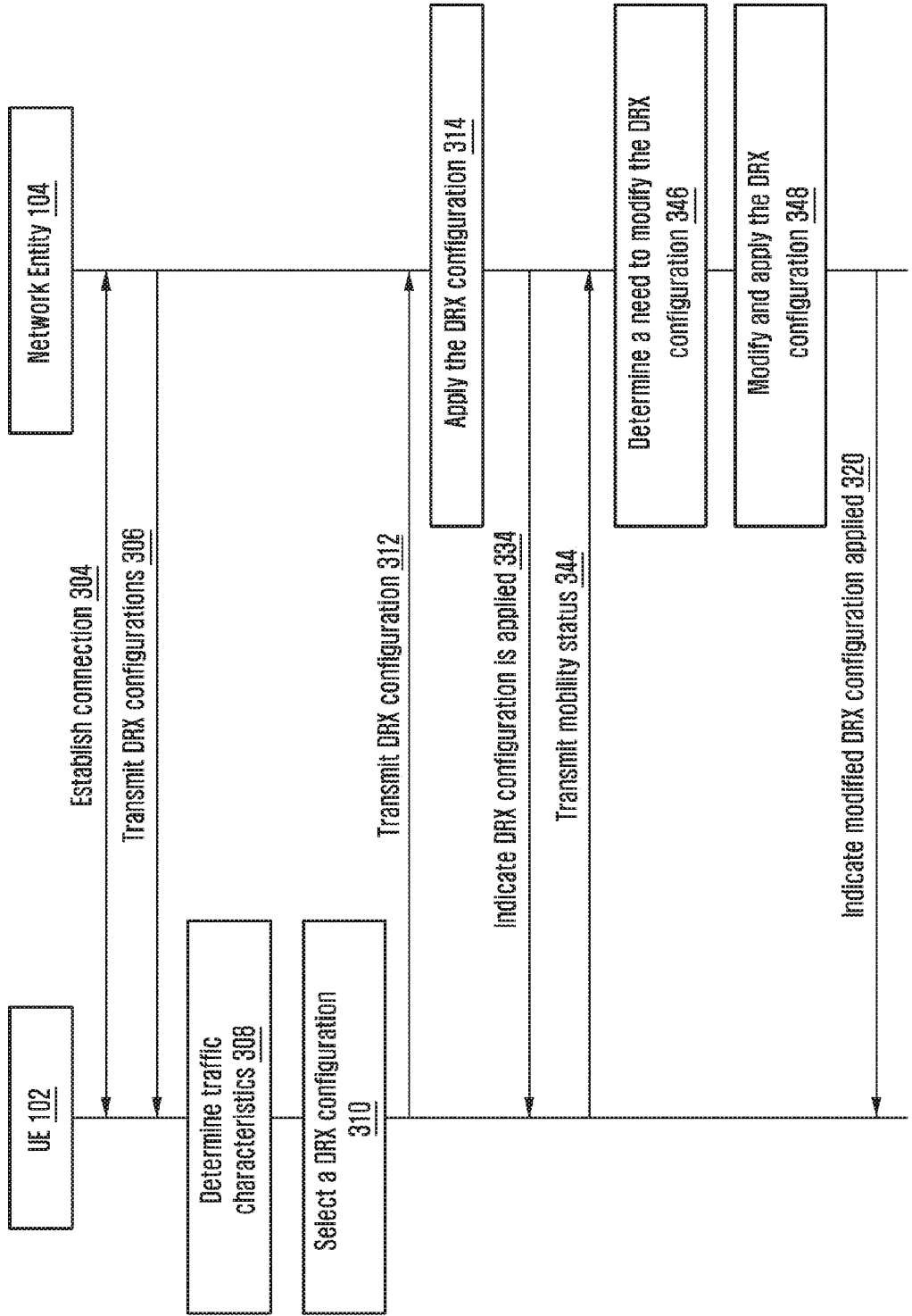
FIG. 3d illustrates a flow diagram on a process of configuring one of the Radio Access Network (RAN) parameters, Discontinuous Reception (DRX) configuration, in accordance with an embodiment of the present invention.

FIG. 3d illustrates a flow diagram on a process of configuring one of the Radio Access Network (RAN) parameters, Discontinuous Reception (DRX) configuration, in accordance with an embodiment of the present invention.

The process 300d denotes the effect of change in mobility status of the UE 102 in determining the RAN parameters including the DRX configuration. The connection is established at 304. The network entity 106 transmits a plurality of DRX configurations to the UE 102 at 306. The UE 102 determines the traffic characteristics based on the number or types of the applications that are currently being executed in the UE 102 at 308. Based on the traffic characteristics, the UE 102 selects one among the plurality of DRX configurations and/or other RAN parameters at 310. The UE 102 transmits information on the selected DRX configuration and/or other RAN parameters to the network entity 106, denoted as 312. The network entity 104 applies the selected DRX configuration and/or other RAN parameters in the UE 102 for communication; the step is denoted as 314. Thereafter, an indication of application of DRX configuration and/or other RAN parameters is displayed at step 334. When the UE 102 indicates a change in the mobility status, it is transmitted at step 344. In an embodiment, the mobility status can be sent to the network entity 104 as a report. The network entity, at step 346 determines a need to modify the DRX configurations and/or other RAN parameters, at step 346. The DRX configuration and/or other RAN parameters is modified and applied at the UE 102 in the step 348. An indication of applied modified DRX configuration and/or other RAN parameters is provided at step 320. In another embodiment the mobility status of the UE 102 can be indicated to the network entity 104 in any of the messages or procedures during connection establishment or state transitions.

Figure 3E:
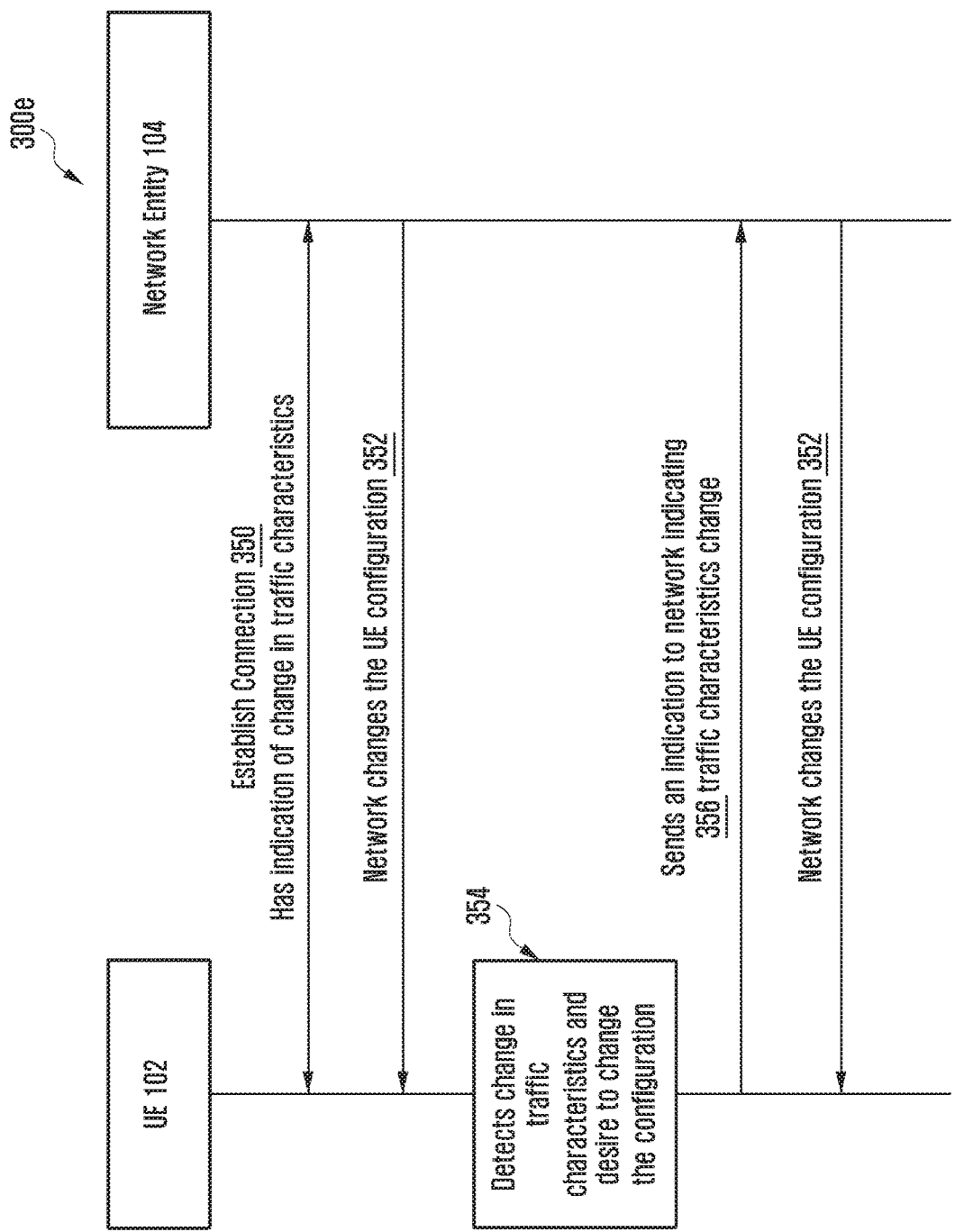
FIG. 3e illustrates a flow diagram on a process of the UE indicating to network at change in the traffic characteristics and the UE desiring to change the configuration, in accordance with an embodiment of the present invention.

FIG. 3e illustrates a flow diagram on a process 300e of the UE 102 indicating to network at change in the traffic characteristics and UE desiring to change the configuration, in accordance with an embodiment of the present invention.

In another embodiment, the UE 102 sends an indication that either during connection setup or during ongoing connection if application composition in the UE 102 changes. For example, the UE 102 can be a mobile communication device with set of applications running on it, the change in application composition may refer to change in number or types or applications being executed in the mobile communication device. Hence, the traffic characteristics changes in the UE 102 as a result of change in application composition. The change in application composition is informed to the network entity 104 such as eNB, at step 350. The change is intimated to the network entity to make the connection for extended period and make the connected to idle transition faster to save the power used in the UE 102.

Further, in an embodiment, It is possible that by performing a Deep Packet Inspection (DPI) at the network entities such as eNB, it can also be found that the change in traffic characteristics and indicate it to UE that it has long lived connection or not and configure itself for corresponding parameters. The network entity 104 changes the DRX configuration and other RAN parameters at step 352. Thereafter, the process 300e continues with verification by the UE 102 to detect the change in the application composition, denoted at step 354. If there is any change in the application composition, the UE 102 sends an indication to the network entity 104. The network entity 104, thereafter, changes the DRX configurations and other RAN parameters for the UE 102. Hence, the process 300e is continued as cycle and in exemplary applications, a predetermined period for this verification of change in the application composition can also be made. For example, from time to time, the UE 102 can change the predetermined periods for verification based on preferences by user as wells as the network entity 104.

Figure 4:
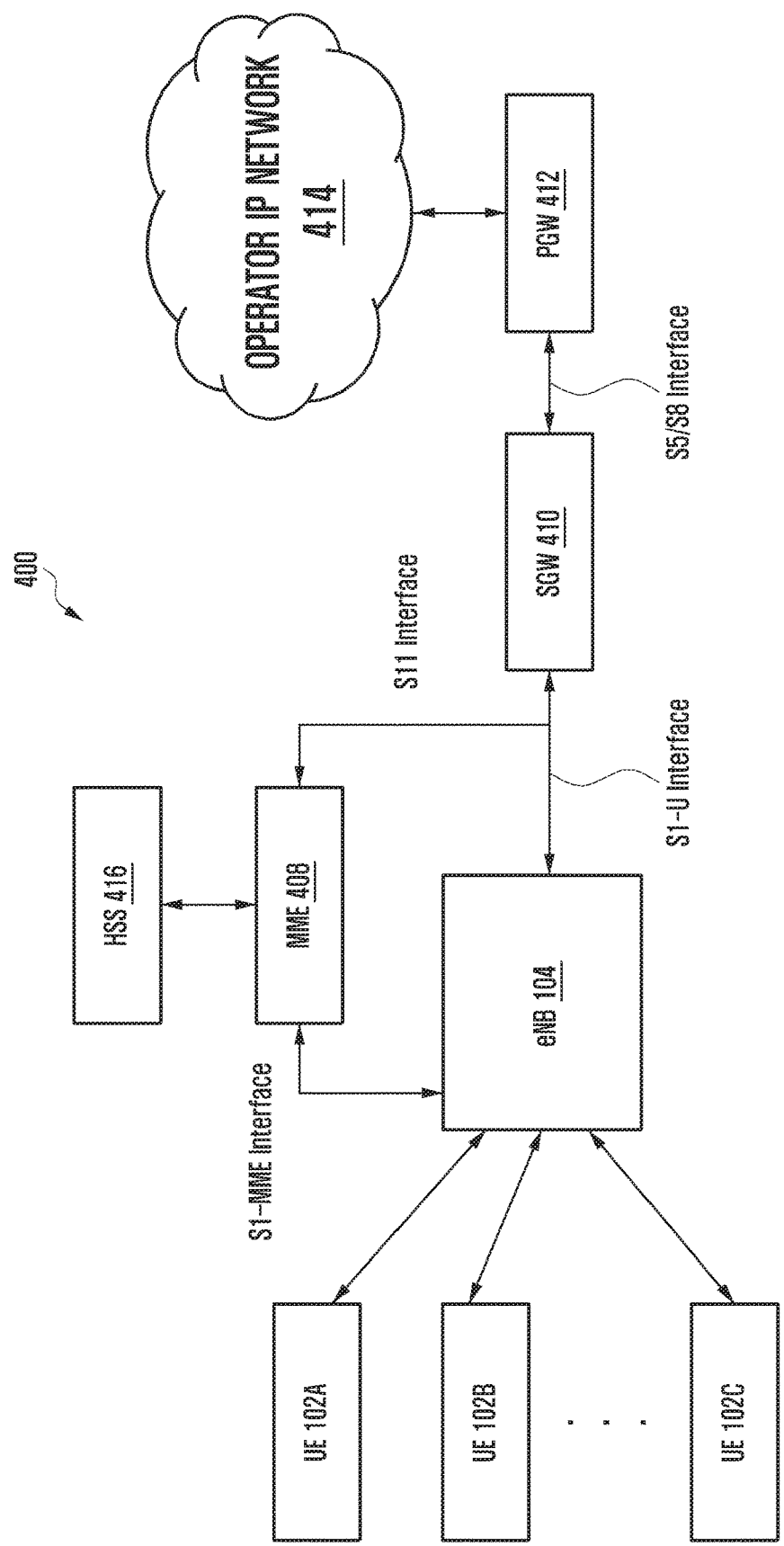
FIG. 4 illustrates a block diagram of a Long Term Evolution (LTE), in accordance with an embodiment of the present invention

FIG. 4 illustrates a block diagram of a network system 400 such as long term evolution (LTE), according to one embodiment. Particularly, the system 400 includes Mobile Tele-Communication (MTC) devices 102A-N (MTC device can also be referred to as user equipment), an evolved Node B (eNodeB) 104, a mobility management entity (MME) 408, a Serving Gateway 410 (SGW), a Packet Data Network (PDN) gateway or Packet Gateway (PGW) 412, an operator IP network 414, and a Home Subscriber Gateway (HSS) 416. The above entities are connected to each other via standardized interfaces (also referred to as network interfaces). Further, a Wireless network is established between the MTC device 102A and e-nodeB 104. The wireless network may be any type of wireless network, including networks that comply with the Mobile WiMAX (based on IEEE 802.16e or IEEE 802.16m), 3GPP LTE, 3GPP2 AIE, IEEE 802.20 or other wireless network standards. In a network operating environment, the plurality of MTCs (102A-N) are also able to communicate directly with each other using the wireless network 104 based on the Mobile WiMAX (based on IEEE 802.16e or IEEE 802.16m), 3GPP LTE, 3GPP2 AIE, IEEE 802.20, WiFi or other wireless network standards.

In an exemplary embodiment, the eNB 104 and the MME 408 are connected via a S1-MME interface 422. Also, the eNB 104 and the serving gateway 410 are connected via a S1-U interface 418. Further, the serving gateway 410 is connected to the MME 408 and the PDN gateway 412 via a S11 interface 424 and a S5/S8 interface 420, respectively. For the purpose of illustration, only one eNodeB 104 is illustrated in the system 400. However, one skilled in the art can realize that there can be more than one eNodeBs in the system 400. Also, each of these eNodeBs is configured for support MTC devices and/or Legacy devices.

In an embodiment, in the system 400, eNB 104 is configured to perform functions such as Radio Resource Management (RRM), header compression, encryption, selection of MME, packet routing to SGW, etc. The MME 408 involves in mobility, security, PGW and SGW selection, etc. SGW 410 hosts functions such as mobility anchoring, packet inspection, packet routing, buffering. PGW 412 handles functions such as packet filtering, inspection, and packet marking. These characteristic components though may be viewed as a part of LTE networking system; they can be mimicked or replaced with other components performing similar functions. However, the LTE networking system is one of the characteristic improvements witnessed in high speed data transmission and reception, and, by and large, may be perceived as a network system on its own, comprising number of network entities.

Figure 5:
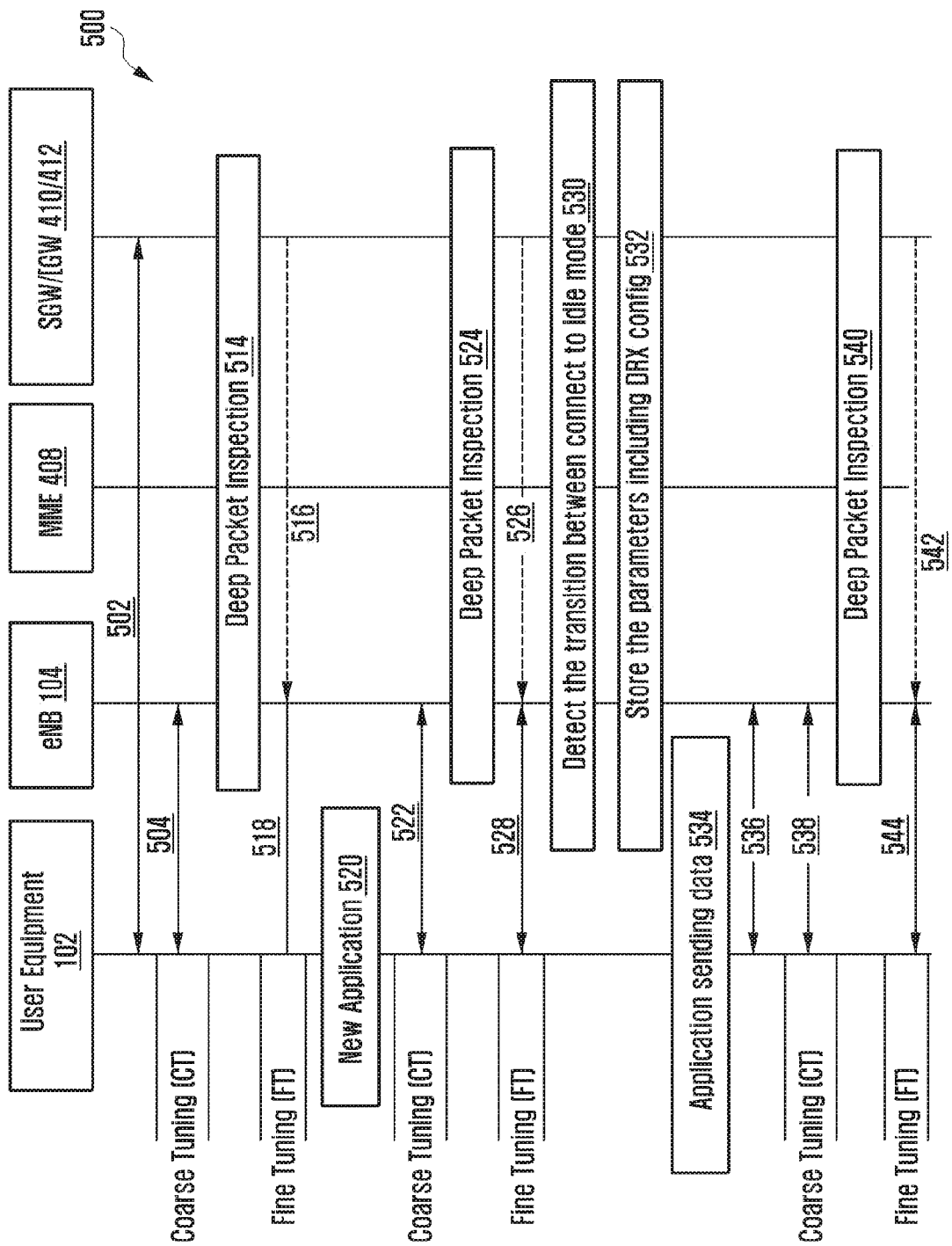
FIG. 5 illustrates a flow diagram for a process of configuring the RAN parameter, the DRX configuration, in accordance with an embodiment of the present invention.

FIG. 5 illustrates a flow diagram emphasizing on a process 500 of configuring one of the Radio Access Network (RAN) parameters, Discontinuous Reception (DRX) configuration, in accordance with an embodiment of the present invention.

The process 500 begins by establishing connection between the user equipment 102 and other network entities eNB 104, MME 108, SGW 110, and PGW 112. The establishment of connection is denoted at 502, with a flow line. Typically, after establishing connection, in order to configure the DRX configuration, multiple phases of data transfer (transmission and reception) occurs, and each phase of transmission that are dedicated to configure the DRX configuration is comprised of two sub-phases including Coarse Configuration or Tuning, labelled as CT in the FIG. 5 and Fine Tuning, labelled as FT in the FIG. 5.

The user equipment (UE) 102 transfers one or more inputs at the CT sub-phase of a first phase, denoted by 504 in the figure to re-configure Radio Access Network (RAN) parameters including the DRX configuration associated with the user equipment 102. The inputs are transferred to one of the network entities, i.e. one of the eNB 104, the MME 108, the SGW 110, and the PGW 112. On receiving the inputs from the user equipment 102, a Deep Packet Inspection (DPI) is performed at the end of the network entities. In an embodiment, the DPI can be performed by the eNB 104 to determine data or pack characteristics associated with the user equipment 102 with the network entities. For performing DPI, the eNB 104 may use history of data transfer of the user equipment 102 with the network entities. At 516, results of the DPI are analysed and changes are incorporated in the RAN parameters including the DRX pattern as a result of reconfiguration. The DRX configuration may be directly or indirectly responsible for data transmission or reception pattern in the user equipment 102 during selective portions of idle mode and connected mode. The reconfigured DRX configuration and other RAN parameters are received at 518 at the UE 102.

Initiation of new application or change in applications running in the UE 102 is detected and determined, denoted with a flow line as 520. In light of the change in applications or addition of the new application in the UE 102, a new set of inputs may be sent by the UE 102 to the network entity (one or more combination of eNB 104, MME 108, SGW 110, and PGW 112). The step is denoted with a flow line as 522. The network entity performs the DPI, denoted with a flow line as 524. A reconfigured DRX pattern and certain RAN parameters with the DPI results incorporated are sent at 526 and then received at the UE 102, denoted with a flow line as 528. The connection of the UE 102 is released thereafter with the RAN, Random Access Network. The current DRX configuration and the RAN parameters may be stored, 530, at one of the network entities (eNB 104, MME 108, SGW 110, and PGW 112). In an exemplary embodiment, the stored DRX configurations and RAN parameters in the one of the network entities will have a life time and can be invalidated after a life time.

In an exemplary embodiment, with the increase in DRX active times or increase in the need to keep the UE 102 in connected mode for a long time, Up-Link Physical Uplink Control Channel (UL PUCCH) resources may become scarce or unutilized. Hence, the UL PUCCH resources need to be tuned along with the mobility status (e.g. number of hand-overs performed, the UE 102 last visited cells, the Doppler frequency, the velocity of the UE 102 that is being reported or measured) and traffic status (traffic characteristics unique to the UE 102 based on applications). For example, when the UE 102 is in low mobility state some of the RAN parameters such as Channel Quality Indicator (CQI), Pre-coding Matrix Indicator (PMI), Rank Indication (RI), and Sound Reference Signal (SRS) do not differ much and when reported on minor changes, it may be perceived as disadvantaged utilization of resources. Reporting of these parameters may be stopped or the frequency of the reporting can be reduced. In other words, the UE 102 can directly report the mobility state such as low, high, medium etc. for which thresholds may be set in the network. Further, reporting of the RAN parameters related to mobility status may be performed by the UE 102 by L2 or L3 signalling.

Further, when a new application is detected, the UE 102 starts sending data at step 532. The connection of the UE 102 with the RAN is re-established at 534. The stored DRX pattern and the other RAN parameters, as mentioned at 530, is retrieved at 536 and applied for communication with the UE 102. The retrieval and application of the stored DRX pattern and the other RAN parameters is performed by at least one of the network entities (eNB 104, MME 108, SGW 110, and PGW 112). To verify whether the retrieved DRX pattern the other RAN parameters are the suitable ones, one of the network entities perform the DPI with respect to the UE 102. The step is denoted at 538. In addition to the DPI inputs, the retrieved DRX pattern the other RAN parameters are reconfigured 540 (flow line) and applied 542 (flow line) at the UE 120.

In an embodiment, the steps described above may be performed as a cycle or as a continuous improvement process with the UE 102, in combination with the network entities to achieve an optimum DRX pattern and RAN parameters.

Figure 6:
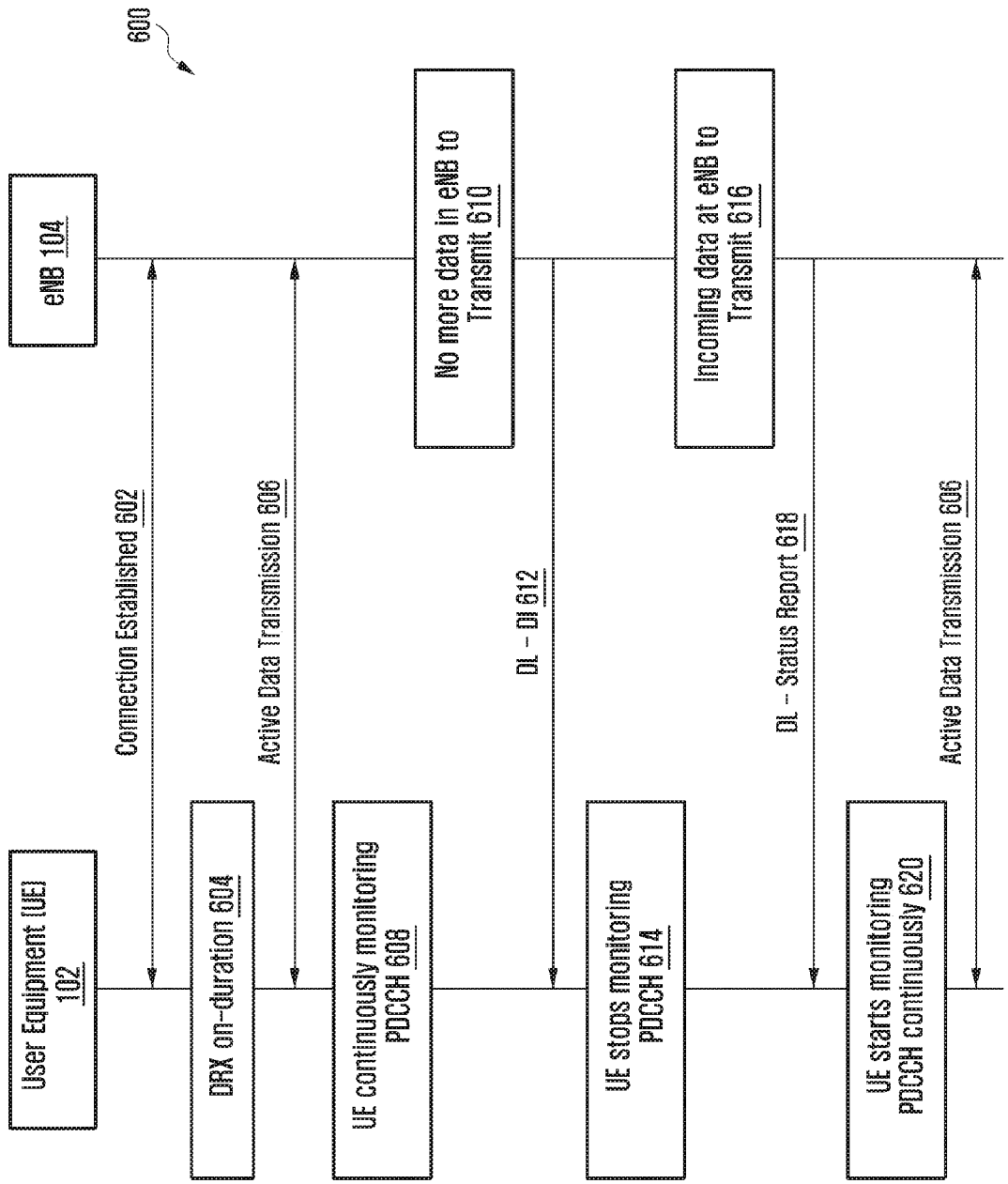
FIG. 6 illustrates a flow diagram illustrating a process 600 of updating the DRX configuration by monitoring channels of an LTE network, in accordance with an embodiment of the present invention.

FIG. 6 illustrates a flow diagram illustrating a process 600 of updating the DRX configuration by monitoring channels of an LTE network, in accordance with an embodiment of the present invention.

Further, in an embodiment, the UE 102 in connected mode, 602, the UE 102 may have to follow the DRX configuration though there is no active data, denoted by 606. At 608, In DRX ON duration of the DRX configuration, the UE 102 continuously monitors and decodes Physical Downlink Control Channel (PDCCH). When there is no data in Down Link (DL), 610, and the UE 102 has entered DRX ON as part of DRX cycle, the system 100 may need to communicate about DL data status to the UE 102, denoted by 612. Thereafter, the UE 102 stops monitoring the DL status. At 616, the communication between the UE 102 and the system 100 may encompass, the system 100 sending data indicating at the start of DRX ON period in the DRX configuration that there is no data and the UE 102 can stop decoding PDCCH. In another mode, 618, of communication may be the UE 102, by default may not start PDCCH decoding at the start of DRX on period in DRX configuration, for which the system 100 need to send a Down Link-Status Report (DL-SR) to start PDCCH decoding. In yet another mode, 620 of communication may be that the UE 102 may decode PDCCH for few sub frames from the start of DRX ON and halt PDCCH decoding if no PDCCH is decoded in those sub frames.

Figure 7:
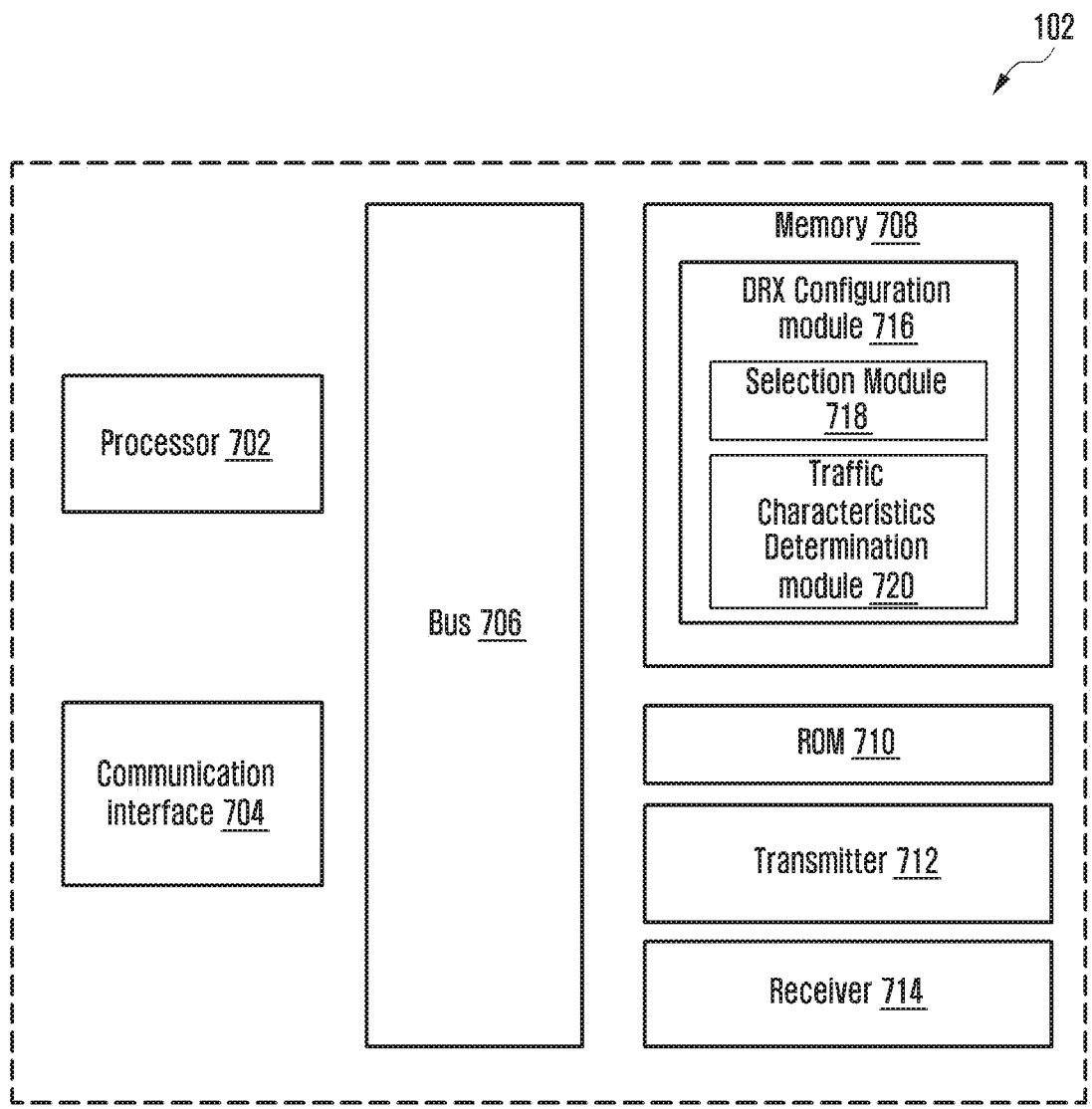
FIG. 7 is a block diagram illustrating user equipment capable of managing the RAN parameter, the DRX configuration, in accordance with an embodiment of the present invention.

FIG. 7 is a block diagram illustrating the User Equipment (UE) 102 capable of managing the RAN parameter, the DRX configuration, in accordance with an embodiment of the present invention.

The UE 102 includes a processor 702, memory 704, a read only memory (ROM) 706, a transceiver 708, a bus 710, a transmitter 712, and a receiver 814.

The processor 702, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 702 may also include embedded controllers, such as generic or programmable logic devices or arrays, application specific integrated circuits, single-chip computers, smart cards, and the like.

The memory 704 may be volatile memory and non-volatile memory. The memory 704 includes a DRX configuration module 716 for managing the RAN parameters, and the DRX configurations. The DRX configuration module 716 may include a predefined set of instructions for different configuration requirements of Discontinuous Reception mode of the UE 102. In an embodiment the DRX configuration module 716 includes a selection module 716 configured to select one DRX configuration from a plurality of DRX configuration sent from the network entity 104, and a traffic characteristics determination module to determine traffic characteristics of the UE 102 continuously for any change in the application composition occurring. A variety of computer-readable storage media may be stored in and accessed from the memory elements. Memory elements may include any suitable memory device(s) for storing data and machine-readable instructions, such as read only memory, random access memory, erasable programmable read only memory, electrically erasable programmable read only memory, hard drive, removable media drive for handling memory cards, Memory Sticks™, and the like.

Embodiments of the present subject matter may be implemented in conjunction with modules, including functions, procedures, data structures, and application programs, for performing tasks, or defining abstract data types or low-level hardware contexts. Machine-readable instructions stored on any of the above-mentioned storage media may be executable by the processor 702. For example, a computer program may include machine-readable instructions capable of configuring the set of RAN parameters and the plurality of DRX configurations. In one embodiment, the computer program may be included on a storage medium and loaded from the storage medium to a hard drive in the non-volatile memory. The transceiver 708 is configured for transmitting the DRX configurations and the set of parameters or RAN parameters to the serving gateway 410 over a single S1-U bearer via the S1-U interface 418.

Figure 8:
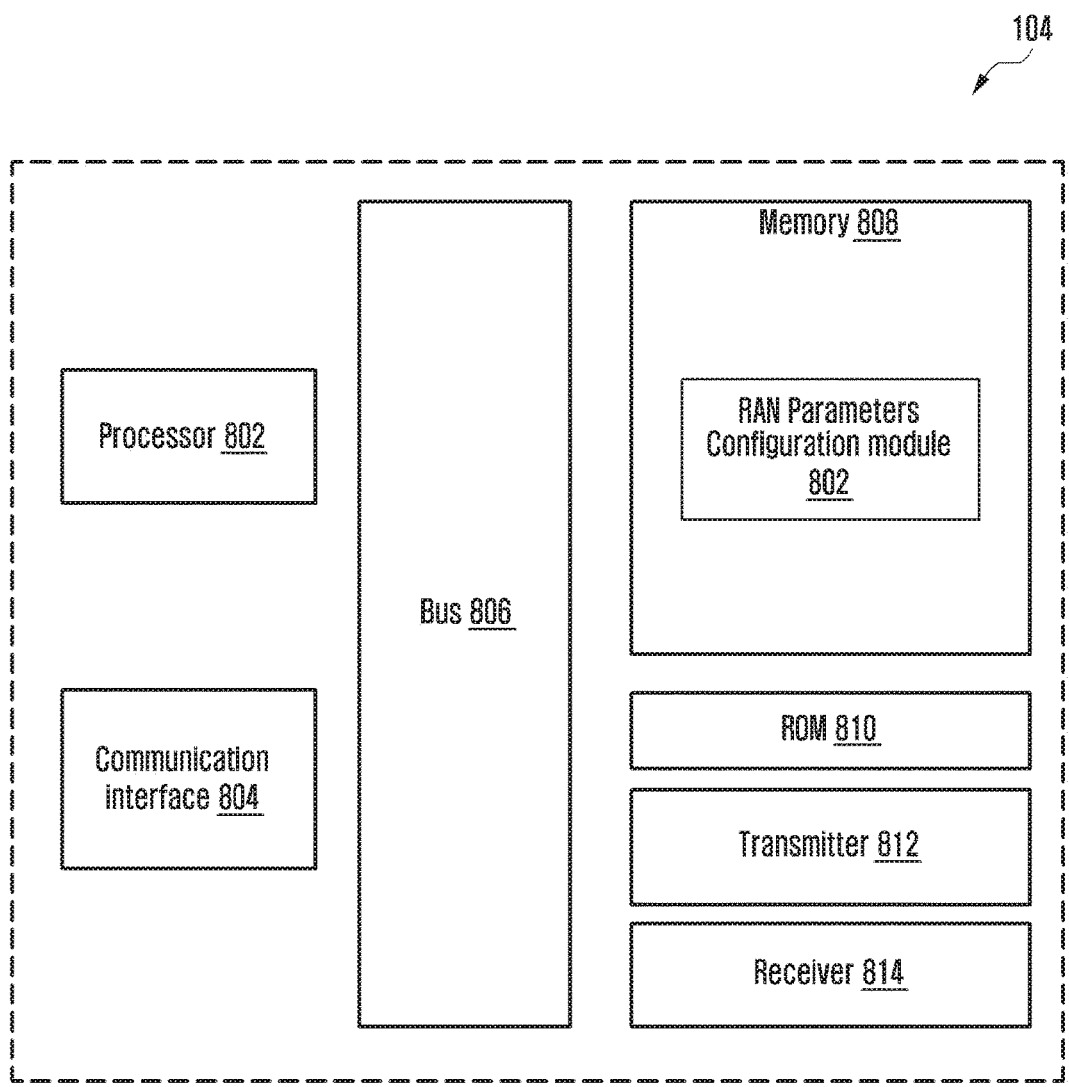
FIG. 8 is a block diagram illustrating an evolved node (eNB) capable of managing the RAN parameter, the DRX configuration, in accordance with an embodiment of the present invention.

FIG. 8 is a block diagram illustrating the evolved node (eNB) 104 capable of managing the RAN parameter, the DRX configuration, in accordance with an embodiment of the present invention In an embodiment, the evolved node B 104 or the network entity 104 includes a processor 802, memory 804, a read only memory (ROM) 806, a transceiver 808, and a bus 810, a transmitter 812, and a receiver 814.

The memory 804 may be volatile memory and non-volatile memory. The memory 804 includes a RAN parameters configuring module 816 for managing the RAN parameters, including the DRX configurations. The RAN parameters configuring module 816 may include a predefined set of instructions for different configuration requirements of RAN parameters for variety of modes including Discontinuous Reception mode of the UE 102. T The present embodiments have been described with reference to specific example embodiments; it will be evident that various modifications and changes may be made to these embodiments without departing from the broader spirit and scope of the various embodiments. Furthermore, the various devices, modules, selectors, estimators, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

The invention claimed is:

1. A method for providing power preference information by a terminal in a wireless communication system, the method comprising:
    receiving, from a base station, configuration information associated with a power preference indication of the terminal;
    determining whether current power preference information for the terminal is different from previous power preference information for the terminal based on the configuration information;
    transmitting, to the base station, assistance information including a power preference indication associated with the current power preference information in case that the current power preference information is different from the previous power preference information;
    transmitting, to the base station, information on mobility status of the terminal, wherein the information on mobility status includes a number of hand-overs performed, information on visited cells, and information on a speed of the terminal; and
    receiving, from the base station, discontinuous reception (DRX) configuration information determined based on the assistance information and the information on mobility status.

2. The method according to claim 1, further comprising:
    determining change in traffic characteristics of applications running in the terminal, wherein the change in the traffic characteristics is associated with the current power preference information; and
    receiving, from the base station, modified DRX configuration information configured based on the change in the traffic characteristics.

3. A method for receiving power preference information by a base station in a wireless communication system, the method comprising:
    transmitting, to a terminal, configuration information associated with a power preference indication of the terminal;
    receiving, from the terminal, assistance information including a power preference indication associated with current power preference information for the terminal in case that the current power preference information for the terminal is different from previous power preference information for the terminal based on the configuration information;
    receiving, from the terminal, information on mobility status of the terminal, wherein the information on mobility status includes a number of hand-overs performed, information on visited cells, and information on a speed of the terminal; and
    transmitting, to the terminal, discontinuous reception (DRX) configuration information determined based on the assistance information and the information on mobility status.

4. The method according to claim 3, further comprising:
    determining whether any of a plurality of discontinuous reception (DRX) configurations is suitable for the current power preference information; and
    transmitting DRX configuration information corresponding to determined DRX configuration to the terminal.

5. The method according to claim 3, further comprising:
    transmitting modified DRX configuration information corresponding to change in traffic characteristics of applications running in the terminal,
    wherein the change in the traffic characteristics is associated with the current power preference information.

6. A terminal for providing power preference information in a wireless communication system, the terminal comprising:
    a transceiver; and
    at least one controller coupled with the transceiver and configured to control to:
        receive, from a base station, configuration information associated with a power preference indication of the terminal,
        determine whether current power preference information for the terminal is different from previous power preference information for the terminal based on the configuration information,
        transmit, to the base station, assistance information including a power preference indication associated with the current power preference information in case that the current power preference information is different from the previous power preference information,
        transmit, to the base station, information on mobility status of the terminal, wherein the information on mobility status includes a number of hand-overs performed, information on visited cells, and information on a speed of the terminal, and
        receive, from the base station, discontinuous reception (DRX) configuration information determined based on the assistance information and the information on mobility status.

7. The terminal according to claim 6, wherein the at least one controller is further configured to control to:
    determine change in traffic characteristics of applications running in the terminal, wherein the change in the traffic characteristics is associated with the current power preference information; and
    receive, from the base station, modified DRX configuration information configured based on the change in the traffic characteristics.

8. A base station for receiving power preference information in a wireless communication system, the base station comprising:
    a transceiver; and
    at least one controller coupled with the transceiver and configured to control to:
        transmit, to a terminal, configuration information associated with a power preference indication of the terminal,
        receive, from the terminal, assistance information including a power preference indication associated with current power preference information for the terminal in case that the current power preference information for the terminal is different from previous power preference information for the terminal based on the configuration information,
        receive, from the terminal, information on mobility status of the terminal, wherein the information on mobility status includes a number of hand-overs performed, information on visited cells, and information on a speed of the terminal, and transmit, to the terminal, discontinuous reception (DRX) configuration information determined based on the assistance information and the information on mobility status.

9. The base station according to claim 8, wherein the at least one controller is further configured to control to:

determine whether any of a plurality of discontinuous reception (DRX) configurations is suitable for the current power preference information; and transmit DRX configuration information corresponding to determined DRX configuration to the terminal.

10. The base station according to claim 8, wherein the at least one controller is further configured to control to transmit modified DRX configuration information corresponding to change in traffic characteristics of applications running in the terminal, and wherein the change in the traffic characteristics is associated with the current power preference information.

* * * * *